United States Patent [19]

Bontrager

[11] Patent Number: 5,290,052
[45] Date of Patent: Mar. 1, 1994

[54] MECHANICALLY JOINED STEERING ASSEMBLY

[76] Inventor: Ketih D. Bontrager, 342 Morrissey Blvd., Santa Cruz, Calif. 95062

[21] Appl. No.: 765,846

[22] Filed: Sep. 26, 1991

Related U.S. Application Data

[60] Division of Ser. No. 445,083, Nov. 30, 1989, Pat. No. 5,060,961, which is a continuation of Ser. No. 122,033, Nov. 18, 1987, abandoned.

[51] Int. Cl.$^5$ .............................................. B62K 19/32
[52] U.S. Cl. .................................. 280/279; 74/551.1; 74/551.3; 74/551.6; 74/551.8; 280/276; 280/280; 403/389; 403/391; 403/396
[58] Field of Search ............ 280/279, 280, 276, 281.1; 74/551.1, 551.3, 551.6, 551.8; 403/389, 391, 396, 375

[56] References Cited

U.S. PATENT DOCUMENTS

| | | | |
|---|---|---|---|
| 393,387 | 11/1888 | Norton | 280/276 |
| 545,948 | 9/1895 | DeLany | 280/280 |
| 556,880 | 3/1896 | Clement | 280/280 |
| 576,831 | 3/1897 | Accles et al. | 280/280 |
| 583,022 | 5/1897 | Bolte | 280/279 |
| 589,147 | 8/1897 | Sturges | 280/280 |
| 609,937 | 4/1898 | Kelly | 280/280 |
| 614,774 | 11/1898 | Spiker | 74/551.1 |
| 623,507 | 4/1899 | Barnish, Jr. | 280/280 |
| 641,858 | 1/1900 | Halifax | 280/280 |
| 1,388,961 | 8/1921 | Lewis | 280/279 |
| 2,511,320 | 6/1950 | Benson | 280/279 |
| 3,889,975 | 6/1975 | Falconi | 280/281 |
| 4,288,171 | 9/1981 | Kottke | 403/389 |
| 4,830,390 | 5/1989 | Yamaki et al. | 280/280 |
| 6,241,182 | 5/1899 | Cook | 280/280 |

FOREIGN PATENT DOCUMENTS

| | | | |
|---|---|---|---|
| 874865 | 4/1953 | Fed. Rep. of Germany | 280/279 |
| 3223728 | 12/1983 | Fed. Rep. of Germany | 280/276 |
| 836956 | 10/1938 | France | 280/280 |
| 1030006 | 3/1953 | France | 280/276 |
| 1032268 | 3/1953 | France | 280/276 |
| 1084795 | 7/1954 | France | 280/279 |
| 1479509 | 3/1967 | France | 280/279 |
| 399827 | 6/1941 | Italy | 280/279 |
| 21944 | 9/1897 | United Kingdom | 280/280 |
| 11559 | 5/1898 | United Kingdom | 280/280 |

OTHER PUBLICATIONS

Copy of relevant pages of catalogue publication of Interpart Corp., printed in U.S.A. in 1978; please see the crowns illustrated at pp. 6 and 16.

Copy of the relevant pages of catalogue publication of Accessory Distributors Inc. printed in 1979: please see the crowns illustrated at pp. 26, 28 and 29.

Copy of the Advertisement leaflet by Forcelle Italia S.p.A. published in 1981.

*Primary Examiner*—Mitchell J. Hill
*Attorney, Agent, or Firm*—Robert O. Guillot

[57] ABSTRACT

A mechanically joined steering assembly for supporting the wheel of a wheeled vehicle for steering movement relative to the frame of the vehicle. The steering assembly includes a crown attached by mechanical fasteners to blades and to a central steering portion joining the assembly to the frame of the vehicle. The parts joined are the blades (16), steerer (14), crown (12), and reinforcements (24). Mechanical fasteners serviceable with common tools provide a reinforced steering assembly of greater strength than welded or brazed constructions. This assembly allows the use of metallic, advanced composite, or thermoplastic components. Adjustments of axle location and steering geometry are made by sliding blades (16) up or down in crown (12). Blades (16), steerer (14), and crown (12) retain the original cold drawn strength of the metal used by mechanically joining without brazing or welding.

1 Claim, 2 Drawing Sheets

MECHANICALLY JOINED STEERING ASSEMBLY

This is a divisional of copending application Ser. No. 07/445,083 filed on Nov. 30, 1989, issued as U.S. Pat. No. 5,060,961 on Oct. 29, 1991 which is a continuation of abandoned prior U.S. application Ser. No. 07/122,033, filed Nov. 18, 1987.

BACKGROUND—FIELD OF INVENTION

Generally this invention relates to a steering assembly for supporting the wheel of a wheeled vehicle for steering movement relative to the frame of the vehicle, and more particularly to improvements in bicycles, motor bicycles and the like, especially for use in competitive or off-road cycling where an increase in strength and serviceability of said steering assembly is an advantage.

BACKGROUND—DESCRIPTION OF PRIOR ART

A recent increase in interest in off-road vehicle sports has generated a demand for bicycles, motor bicycles, and the like that must withstand increased loads and impact with uncertain ground surfaces.

Heretofore a wide variety of steering assemblies have been proposed and implemented for wheeled vehicles.

Traditional steering assemblies are brazed or welded together from separate parts into a final assembly. The parts typically joined together by this process are the blades, steerer, crown, and reinforcements. The fork assembly in U.S. Pat. No. 609,937 to Kelly 1898, Aug. 30, had a frame stem, curved fork blades, and crown brazed together.

The front fork crown assembly in U.S. Pat. No. 641,858 to Halifax, 1900, Jan. 23 had a V-shaped assembly without separate fork blades that was brazed or welded into final assembly. The front steering fork in U.S. Pat. No. 576,831 to Accles and Renout, 1897, Feb. 9 had the crown mechanically attached to the steering stem with the crown integral with the fork blades. The steering fork in U.S. Pat. No. 623,507 to Barnish 1899, Apr. 25 provided splineways to receive splines on the end of the fork arm.

The welding or brazing process used in these designs reduces the strength of the material in the vicinity of the weld. The affected area of the steering assembly is called the heat affected zone. The losses in strength are due to the heat treating effect of the joining operation, either tempering, or annealing and tempering the assembly material. Typical losses for high quality steel forks are on the order of thirty percent in yield strength.

Users of wheeled vehicles, especially off-road and competitive bicycles and motor bicycles regard this type of assembly as unsatisfactory because of the high failure rate of this type of steering assembly when subjected to significant impact and bending loads.

Steering assemblies are structures that are subject to cantilever bending forces that act on the blades. Cantilever forces are those in which the beam that supports the load is not reinforced by any structure other than that at the attached end or by reinforcing the beam itself.

The design of current steering assemblies causes the highest bending loads to be concentrated at the heat affected zones. This makes the overall strength of the blades low compared to the potential strength of the material used. The traditional method of constructing steering assemblies for bicycles, motor bicycles and the like, makes this undesirable situation inevitable.

Off-road bicycles and other wheeled vehicles ridden for sport and recreation are a recent development. These wheeled vehicles, unlike vehicles designed for use on paved surfaces, are frequently subject to very high stress loads. The combination of uncertain ground surfaces and landing on the ground after jumping high in the air leads to significant impact and bending loads on the steering assembly. Traction in some circumstances may be very high and the load on the steering assembly under braking significant.

The steering assemblies and frames for these vehicles have evolved from traditional designs and methods. The current off-road steering assembly regularly fail as a result of the loads described. This is a result directly related to the design and construction of these assemblies and demonstrates the need for a new approach to this problem. This is especially true for sporting and competitive applications.

A further problem with current designs is that when damaged the user's alternatives are to replace the entire blade assembly or have the blade repaired by a specialist. The typical user cannot repair the steering assembly with simple hand tools. The cost of having the specialist repair the blade is frequently higher than the cost of the new blade.

The demands on the steering and handling characteristics of off-road wheeled vehicles vary with the riding conditions. The steering assembly is an integral part of the vehicle whether bicycle, motor bicycle or the like. Traditional steering assemblies offer no adjustment possibilities other than replacement with new blades of different dimensions.

Most users, therefore, would find it desirable to have a steering assembly that could withstand the loads and stresses of off-road travel, be adjustable and serviceable should any component of the assembly fail, and have the option of replacing individual components rather than the entire assembly.

OBJECTS AND ADVANTAGES

Accordingly we claim the following as our objects and advantages of the invention: to provide a steering assembly for wheeled vehicles that can withstand the loads and stresses of off-road travel as well as road travel, to provide a steering assembly for wheeled vehicles that is easily and reliably adjustable, and to provide a steering assembly in which components may be individually replaced if damaged.

In addition we claim the following objects and advantages: to provide a steering assembly that can be used with blades of varying strength by altering wall thickness, to provide a steering assembly so that the blades and steerer retain their original cold drawn metal strength, to provide a crown assembly that eliminates the difficulty of using advanced composite material at the junction of the blade and steerer assembly, to provide a steering assembly that can be reinforced at high stress points or high bending load areas at the top of the blades, to provide a steering assembly that is easily serviceable and all parts replaceable with simple hand tools, to provide a steering assembly that facilitates manufacture because of reduced complexity of the design, to provide a steering assembly with a circlip connecting the steerer to the crown, and to provide a steering assembly with blade stop bands to prevent the wheel from contacting the frame if blades fail.

Readers will find further objects and advantages of the invention from a consideration of the ensuing description and accompanying drawings.

DRAWING FIGURES

DRAWING REFERENCE NUMERALS

| | |
|---|---|
| 12 | crown |
| 14 | steerer |
| 16 | blades |
| 18 | inside bore of blade |
| 20 | crown bearing race adapter |
| 22 | bolts |
| 24 | reinforcement |
| 26 | circlip |
| 28 | steerer bore hole in 12 |
| 30 | blade bore hole in 12 |
| 32 | blade bore hole in 12 |
| 34 | threaded section for 22 |
| 36 | clearance hole for 22 |
| 38 | seat for 22 |
| 40 | slot for clamping 16 |
| 42 | slot for clamping 14 |
| 44 | blade stop band |
| 56 | groove for 26 |

MECHANICALLY JOINED STEERING ASSEMBLY—DESCRIPTION

Figure 1:
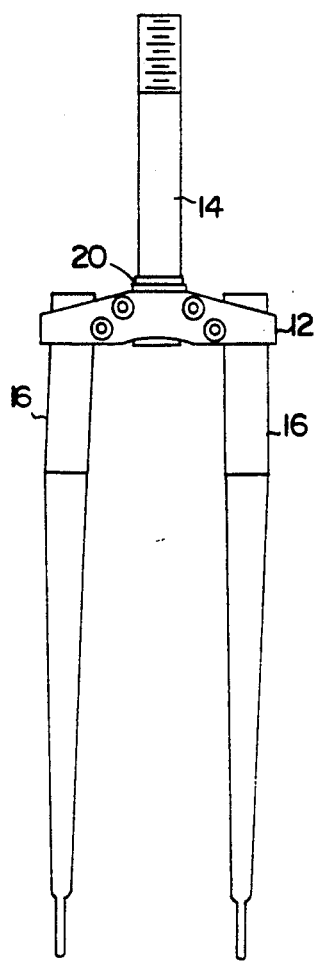
FIG. 1 shows a front view of assembled mechanically joined steering assembly.
Figure 3:
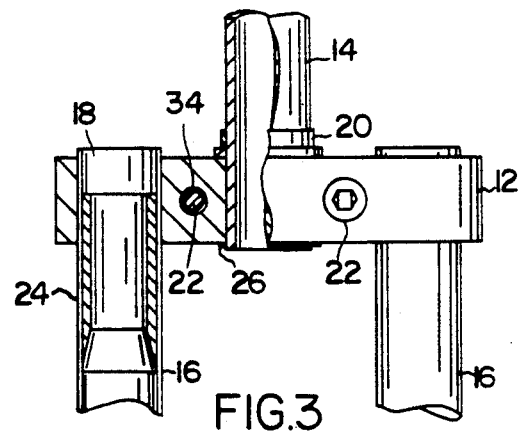
FIG. 3 shows a top view of such assembly.
Figure 4:
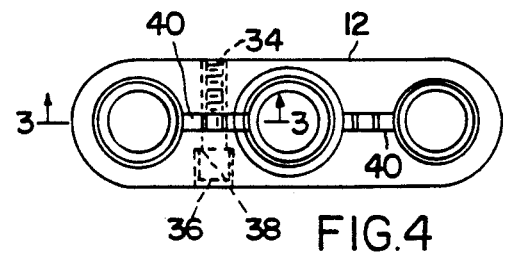
FIG. 4 shows a front view of such assembly along line 3—3 of FIG. 3.
Figure 2:
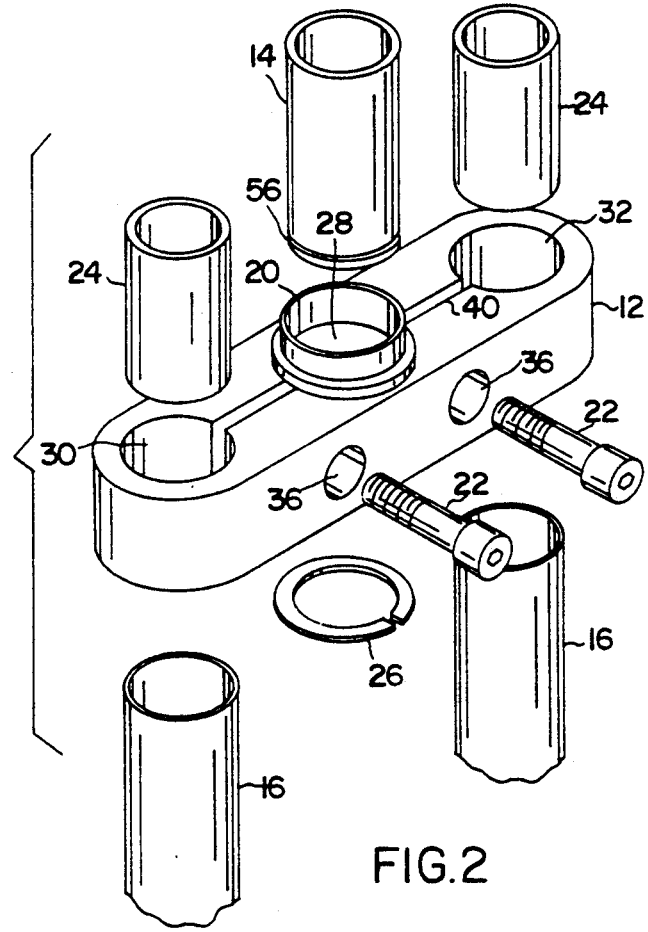
FIG. 2 shows an elevational perspective view of a mechanically joined steering assembly indicating assembly order and location of parts according to the invention.

FIG. 1 shows a mechanically joined steering assembly. FIG. 2 shows the components of the steering assembly according to the preferred embodiment of the invention. The steering assembly comprises a crown 12 with a central steerer bore hole 28 and two blade bore holes 30 and 32. The central bore hole 28 is formed to be a close fit with the steerer 14, and the outer holes 30 and 32 are formed to be a close fit with the upper ends of the blades 16. A slot 40 is formed through a vertical section of crown 12 and through the center of holes 28, 30, and 32. The bolts 22 cause the crown 12 to elastically deform when they are inserted into the clearance hole 36 best seen in FIG. 2 and threaded into the threaded section 34 of crown 12 and tightened against seat 38 in the clearance hole 36 of the crown. This deformation changes the shape of the horizontal section of crown 12 by reducing the width of slot 40 and causes the steerer bore hole 28 and blade bore holes 30 and 32 to change shape, reducing the diameter across crown 12 parallel to the long axis of bolt 22.

The steerer 14 is formed with a circlip groove 56 at the bottom. The circlip 26 is a substantially ring-shaped coupling clamp best seen in FIG. 2. The circlip 26 is installed in the circlip groove 56 of the steerer 14 after the steerer has been inserted into steerer bore hole 28. The steerer is positioned by the circlip 26 contacting the bottom of crown 12 and is tightened into circlip groove 56.

The reinforcements 24 of the blades 16 are formed to be a close fit with the inside bore 18. The reinforcements 24 are joined to the inside bore 18 with adhesive and are located within blade 16 inside bore 18. The blades 16 are then inserted into blade bore holes 30 and 32 in crown 12. The bolts 22 are then tightened to join the crown 12, steerer 14, and blades 16 together. A blade stop band 44 best seen in FIG. 7 may be used to prevent the wheel f rom contacting the crown if the blades fail. Said blade stop band 44 is a substantially ring-shaped protuberance fitting onto blades 16.

The crown bearing race adapter 20 is placed over the steerer 14 and located against the top surface of the crown 12. The crown bearing race adapter 20 is held in place on the steerer 14 with adhesive.

Figure 5:
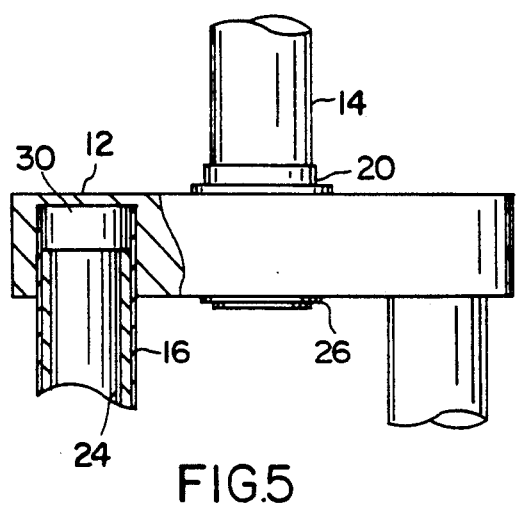
FIG. 5 shows a front view of assembly according to another embodiment of the invention with blade seating in the crown.

FIG. 5 shows a mechanically joined steering assembly according to another embodiment of the invention. The crown 12 is formed with three holes in it, as 28, 30, and 32 in FIG. 2. The central steerer bore hole 28 is formed to be a press fit with the lower end of the steerer 14. The press fits cause the crown 12 to elastically deform when the blades 16 and steerer 14 are inserted into holes 28, 30, and 32 of the crown 12. The crown bearing race adapter 20 is machined integrally in the crown in this embodiment.

Figure 7:
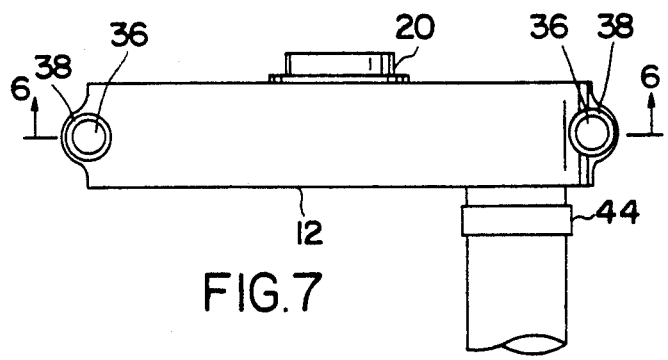
FIG. 7 shows a front view of assembly according to another embodiment with mechanical joining means at ends of crown.
Figure 6:
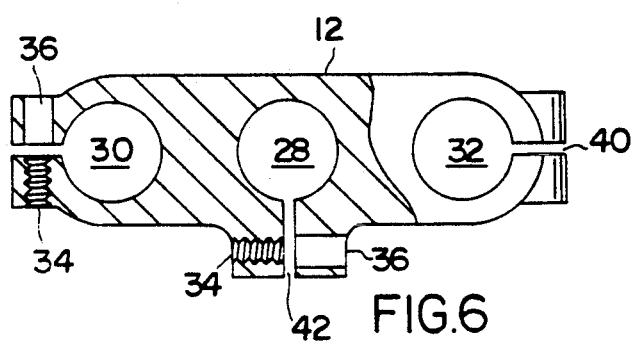
FIG. 6 shows a top sectional view of assembly shown in FIG. 7.

FIG. 6 and FIG. 7 show a mechanically joined steering assembly according to another embodiment of the invention. The crown 12 is formed with three holes as 28, 30, and 32 in FIG. 6. The central steerer hole 28 is formed to be a close fit with the steerer 14 and the outer holes 30 and 32 are formed to be a close fit with the upper end of blades 16. Slots 40 are formed through vertical sections of the crown and through the centerlines of hole 28. The bolts 22 cause the crown to elastically deform when they are inserted into the the holes 28, 30, and 32 to change shape, reducing the diameter measured across the crown parallel to the long axis of bolt 22.

Figure 8:
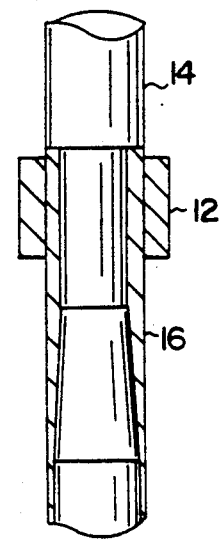
FIG. 8 shows a side sectional view of assembly with blade reinforcement according to another embodiment of the invention.

FIG. 8 shows a mechanically joined steering assembly according to another embodiment of the invention. In this embodiment reinforcements 24 are formed integrally in the upper end of the blades 16.

Figure 9:
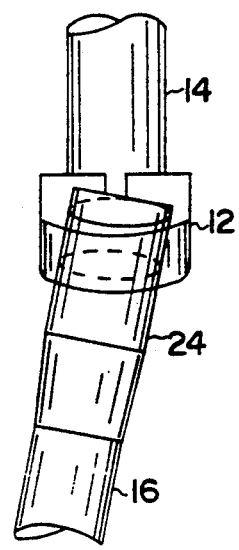
FIG. 9 shows a side section elevational view of assembly showing noncoplanar holes in crown according to another embodiment of the invention.

FIG. 9 shows a mechanically joined steering assembly according to another embodiment of the invention. The crown 12 is formed with holes 30 and 32 in a nonlinear arrangement with steerer hole 28. The outer holes 30 and 32 are formed to be a close fit with the outer edge of reinforcements 24.

The reinforcements 24 are formed to be a close fit with blades 16 with adhesive or press fit and are located on the outside edge of blades 16 as shown in FIG. 9. The blades 16 and reinforcements 24 are then inserted into the holes 30 and 32 in the crown as shown in FIG. 9.

MECHANICALLY JOINED STEERING ASSEMBLY—OPERATION

The mechanically joined steering assembly of FIG. 2 will provide a variety of steering and wheel support functions for wheeled vehicles including bicycles, motor bicycles and the like, but users will find it most useful for bicycle fork assemblies, especially off-road and competitive bicycles.

To assemble the mechanically joined steering assembly the user should turn the bicycle or other vehicle upside down and clamp it onto a work stand. The clamping bolts 22 should be loosely inserted into the threaded holes 36 best seen in FIG. 2. The blades 16 are inserted into the blade bore holes 30 and 32. The steerer is inserted into the steerer bore hole 28 and the circlip is tightened to the bottom of the steerer 14 at the base of crown 12. The crown bearing race adapter 20 is placed on steerer 14 and tightened against the upper surface of crown 12 and steerer 14. The user may then slide the blades 16 up or down as required to center the wheel rim between the blades 16. The crown 12 is then twisted so that it is square with the plane of the wheel rim. The user should then tighten the clamping bolts 22 slightly, recheck the alignment of steerer 14, crown 12, blades 16 and the wheel rim. The clamping bolts 22 are then tightened to their final tension.

Materials that may be used for the construction of the various components of the assembly include steel and high strength white metal alloys. The use of two types of metals is called composite construction. Advanced composite materials, such as carbon fiber may also be used. One such embodiment uses blades 16 made of steel and high strength white metal alloys, with the blades 16 and steerer 14 clamped together by an aluminum or magnesium crown.

To adjust the mechanically joined steering assembly on a bicycle or other wheeled vehicle, the user slides blades 16 up or down to alter the steering characteristics of the bicycle. Alternatively, the user may replace blades 16 with blades of alternative shape to alter the steering geometry of the bicycle or other wheeled vehicle. To adjust or replace with alternative blades the clamping bolts 22 are loosened and the blades 16 moved up or down through holes 30 and 32. Likewise the steerer 14 may be adjusted relative to the crown 12 by loosening bolts 22 and sliding the crown bearing race adapter 20 up the steerer 14. The steerer 14 is then driven down in the crown 12 so that the circlip 26 can be removed. Then the steerer 14 can then be removed from the top of crown 12. If the user intends to replace the steerer 14, the crown bearing race adapter should be removed as well.

To replace the crown race adapter 20 the user will find that conventional race removers will not work. The user should remove the steerer 14 as previously described. Then the crown race adapter 20 can be driven of the bottom of the steerer 14. The user should use grease or anti-seize compounds on the crown race adapter 20 in order to make the next removal as easy as possible.

While the above description contains many specificities, the reader should not construe these as limitations on the scope of the invention, but merely as exemplifications of preferred embodiments thereof. Those skilled in the art will envision many possible variations are within its scope. For example skilled artisans will readily be able to change the dimensions and shapes of the various embodiments. They will also be able to make the steering assembly out of alternative materials such as thermoplastics, advanced composite, and composite metallic compounds. They can make many variations on the adjustment mechanisms of FIG. 1 to FIG. 9, e.g., they can make the crown slotless but with fixed bolts attached thereto and with variations in the positions and angles of the joining members. They can alter the relationship of the fastener bore holes as shown in FIG. 6 and FIG. 7. As an alternative to the foregoing they can arrange an axial seating of the blade or steerer against a shoulder in the crown. In fact they can provide any type of mechanical fastener for mechanically joining the blades to the crown and steering apparatus. Accordingly the reader is requested to determine the scope of the invention by the appended claims and their legal equivalents, and not by the examples that have been given.

I claim:

1. A steering assembly for the front wheel of a bicycle comprising:

a crown;

a steerer, including a tubular portion adapted for engagement to said crown; p1 a first blade, including a tubular portion adapted for engagement to said crown;

a second blade, including a tubular portion adapted for engagement to said crown;

said crown including a single unitary piece of material having an upper surface and a lower surface, said crown having a thickness of said material disposed between said upper surface and said lower surface;

a steerer bore being formed through said material from said upper surface to said lower surface, said steerer bore being adapted to releasably engage said steerer therewithin;

first and second blade bores being formed within said material from said lower surface into said material, each said blade bore being adapted to releasably, frictionally engage one of said blades therewithin;

said frictional engagement of said first blade and said second blade within said first blade bore and second blade bore, respectively, being created only by a physical contact of each said first blade bore and second blade bore, with each of a length of said first blade and a length of said second blade, respectively;

said crown comprising the sole mechanical connection between said first blade and said second blade; and wherein a first cylindrical reinforcement member is disposed within said length of said first blade that is in frictional engagement within said first blade bore, said first cylindrical reinforcement member having an outer diameter that is slightly less than an inner diameter of said first blade, such that said first reinforcement member provides added strength to said engagement of said first blade within said first blade bore; and wherein a second cylindrical reinforcement member is disposed within said length of said second blade that is in frictional engagement within said second blade bore, said second cylindrical reinforcement member having an outer diameter that is slightly less than an inner diameter of said second blade, such that said second reinforcement member provides added strength to said engagement of said second blade within said second blade bore.

* * * * *